(12) United States Patent
Nishino et al.

(10) Patent No.: US 10,042,193 B2
(45) Date of Patent: Aug. 7, 2018

(54) LIQUID CRYSTAL DISPLAY DEVICE AND METHOD FOR MANUFACTURING THE SAME

(71) Applicant: Japan Display Inc., Tokyo (JP)

(72) Inventors: Tomonori Nishino, Tokyo (JP); Syou Yanagisawa, Tokyo (JP); Kentaro Agata, Tokyo (JP); Nobuyuki Ishige, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/493,203

(22) Filed: Apr. 21, 2017

(65) Prior Publication Data

US 2017/0219858 A1     Aug. 3, 2017

Related U.S. Application Data

(63) Continuation of application No. 15/138,404, filed on Apr. 26, 2016, now Pat. No. 9,664,932, which is a
(Continued)

(30) Foreign Application Priority Data

Oct. 22, 2012   (JP) .................................. 2012-232562

(51) Int. Cl.
*G02F 1/1345* (2006.01)
*G02F 1/1333* (2006.01)
(Continued)

(52) U.S. Cl.
CPC .......... *G02F 1/1309* (2013.01); *G02F 1/1368* (2013.01); *G02F 1/13439* (2013.01); *G02F 1/13452* (2013.01); *G02F 1/13458* (2013.01); *G02F 1/133514* (2013.01); *G02F 1/134336* (2013.01); *G02F 1/134363* (2013.01); *G02F 1/136286* (2013.01); *G02F 1/1345* (2013.01);
(Continued)

(58) Field of Classification Search
CPC ....... G02F 2001/136254; G02F 1/1345; G02F 1/1309
See application file for complete search history.

(56) References Cited

U.S. PATENT DOCUMENTS

| | | |
|---|---|---|
| 2001/0030729 A1 | 10/2001 | Onishi |
| 2004/0017531 A1 | 1/2004 | Nagata et al. |

(Continued)

FOREIGN PATENT DOCUMENTS

| | | |
|---|---|---|
| JP | 2004-310024 A | 11/2004 |
| JP | 2006-236870 A | 9/2006 |
| JP | 2010-60696 A | 3/2010 |

*Primary Examiner* — Wen-Ying P Chen
(74) *Attorney, Agent, or Firm* — Typha IP LLC

(57) ABSTRACT

An object of the present invention is to protect exposed inspection pads with a conductive tape when the application of resin is ceased and to enhance the reliability of the inspection pads. A liquid crystal display device is provided with a transparent electrode formed on a superficial side of a CF board, a grounded electrode, an inspection pad and a switching device between the inspection pad and a signal line or a scanning line respectively formed in a terminal area a TFT board and a conductive tape that electrically connects the transparent electrode of the CF board, the grounded electrode and the inspection pad respectively of the TFT board.

9 Claims, 14 Drawing Sheets

Related U.S. Application Data continuation of application No. 14/056,987, filed on Oct. 18, 2013, now Pat. No. 9,354,457.

(51) Int. Cl.
- *G02F 1/13* (2006.01)
- *G02F 1/1368* (2006.01)
- *G02F 1/1335* (2006.01)
- *G02F 1/1343* (2006.01)
- *G02F 1/1362* (2006.01)

(52) U.S. Cl.
CPC ............ *G02F 2001/136254* (2013.01); *G02F 2201/123* (2013.01); *G02F 2203/69* (2013.01)

(56) References Cited

U.S. PATENT DOCUMENTS

| | | | |
|---|---|---|---|
| 2004/0046920 A1* | 3/2004 | Hayata | ................. G02F 1/1345 349/149 |
| 2004/0095549 A1 | 5/2004 | Moon | |
| 2009/0091701 A1 | 4/2009 | Kondo | |
| 2011/0051068 A1* | 3/2011 | Kamon | ............... G02F 1/13452 349/152 |
| 2011/0199738 A1 | 8/2011 | Moriwaki | |
| 2013/0321719 A1* | 12/2013 | Sumida | ................. G02F 1/1333 349/12 |

* cited by examiner

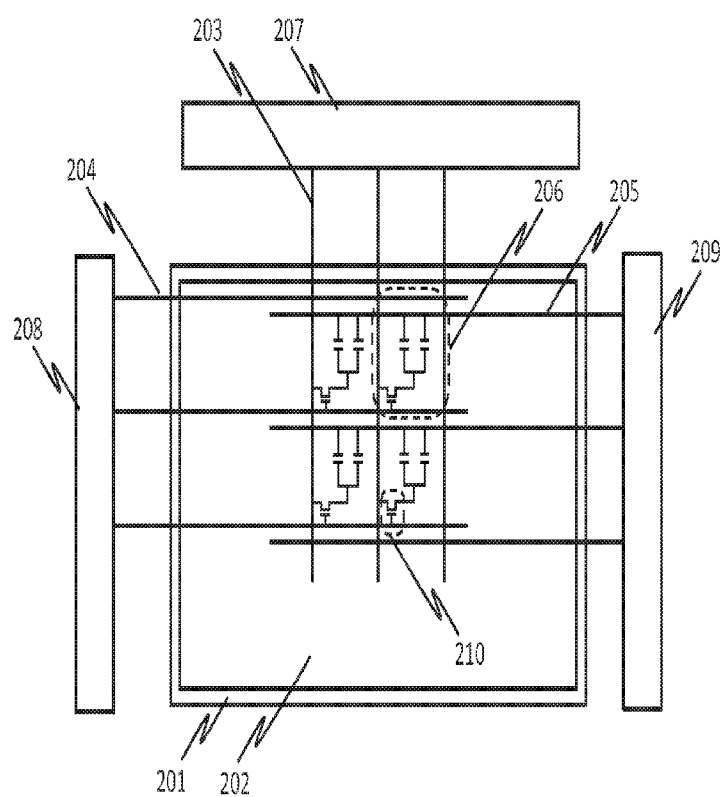

LIQUID CRYSTAL DISPLAY DEVICE AND METHOD FOR MANUFACTURING THE SAME

CROSS-REFERENCE TO RELATED APPLICATIONS

This application is a continuation of U.S. patent application Ser. No. 15/138,404 filed on Apr. 26, 2016, which, in turn, is a continuation of U.S. patent application Ser. No. 14/056,987, now U.S. Pat. No. 9,354,457, filed on Oct. 18, 2013. Further, this application claims priority from Japanese Patent Application No. 2012-232562 filed on Oct. 22, 2012, the contents of which are hereby incorporated by reference into this application.

BACKGROUND OF THE INVENTION

1. Field of the Invention

The present invention relates to a liquid crystal display device, particularly relates to a liquid crystal display device that protects an inspection pad for the inspection of a liquid crystal display panel from corrosion and the like.

2. Description of the Related Art

A liquid crystal display device is widely used for various applications from a small-sized cellular phone handset to a large television set because the device has such many characteristics that the device has high display quality, it is thin and light and its power consumption is low.

For example, an active matrix liquid crystal display device is configured by oppositely arranging a thin film transistor (TFT) board and a color filter (CF) board, sticking them via sealing material and sealing liquid crystal between the two boards. In a display area of the TFT board, plural pixel electrodes arrayed in a matrix, plural scanning lines laterally formed and plural signal lines longitudinally formed respectively corresponding to the pixel electrodes and a thin film transistor (TFT) as a switching device which is connected to the corresponding scanning line and the corresponding signal line and which applies predetermined voltage to the corresponding pixel electrode are formed. In addition, a color filter and the like are formed on the CF board.

In the liquid crystal display device, an inspection pad is arranged in a peripheral area of the TFT board so as to check whether disconnection and a short circuit occur in the wiring of the formed scanning lines and signal lines or not and whether the thin film transistor as the switching device is normally operated or not, and inspection is made at a manufacturing stage of the liquid crystal display device.

For example, it is described in Japanese Patent Application Laid-Open Publication No. 2004-310024 that there is included a liquid crystal display panel provided with a gate line, a data line, a switching device connected to the gate line and the data line, a pixel electrode connected to the switching device and an inspection line isolated from the gate line, the data line, the switching device and the pixel electrode for transmitting an inspection signal to the data line; the inspection line includes an inspection pad to which an inspection signal is transmitted from an external device, the inspection pad is arranged in a part in which the external device is touched to the liquid crystal display panel and hereby; since no inspection pad and no inspection line for inspecting the data line and the gate line are formed between data driving IC and gate driving IC and they are formed on driving IC, a degree of the spatial utilization of the liquid crystal display panel assembly can be enhanced (refer to its abstract).

In the meantime, in a liquid crystal panel according to In-Plane Switching (IPS) and the like, a conductive film is formed on the superficial side of a CF board so as to reduce an effect of electrification charge, and in Japanese Patent Application Laid-Open Publication No. 2010-60696 for example, there is disclosed a liquid crystal display device based upon a liquid crystal display device provided with an electrode board on a surface of which a pixel electrode and a common electrode are arranged, an opposite board arranged opposite to the electrode board and a liquid crystal panel in which liquid crystal material is sealed between the electrode board and the opposite board and having a characteristic that a conductive film formed on the superficial side of the opposite board and wiring for grounding formed on the surface of the electrode board are provided and further, the conductive film and the wiring for grounding are connected via conductive paste (refer to Claim 1).

Further, in Japanese Patent Application Laid-Open Publication No. 2006-236870, as a display device having antistatic reinforced structure using a conductive tape, there is disclosed a display device having a characteristic that a circuit board on which electronic parts are mounted, a display element which is connected to the circuit board and which is driven and a conductive tape that electrically connects a GND terminal provided to the circuit board and the electric parts are provided (refer to Claim 1).

SUMMARY OF THE INVENTION

Heretofore, in a liquid crystal display device, a terminal area on a TFT board in which an inspection pad is arranged is protected with resin and the like. Recently, however, there is a case that no resin is applied because of a constraint on the structure of a module and the reduction of a cost and in that case, an inspection pad remains exposed. In this state, the inspection pad may corrode and the deterioration of reliability is feared.

An object of the present invention is to protect an exposed inspection pad with a conductive tape when the application of resin is ceased and to enhance the reliability of the inspection pad.

To achieve the object, a liquid crystal display device according to the present invention is based upon a liquid crystal display device where a TFT board provided with a pixel electrode arranged in a matrix, a thin film transistor connected to each pixel electrode, plural scanning lines and plural signal lines, and a CF board provided with a color filter are oppositely arranged, and liquid crystal is sealed between the both boards, and has a characteristic that the liquid crystal display device according to the present invention is provided with a transparent electrode formed on a superficial side of the CF board, a grounded electrode, an inspection pad, a switching device between the inspection pad and the signal line or the scanning line formed in a terminal area of the TFT board, and a conductive tape that electrically connects the transparent electrode of the CF board, the grounded electrode and the inspection pad respectively of the TFT board.

The liquid crystal display device according to the present invention may also be provided with a terminal that supplies electric potential which turns the switching device open or closed.

In addition, the liquid crystal display device according to the present invention may also be provided with a terminal that supplies electric potential which turns the switching device in a state in which wiring is short-circuited (hereinafter called "closed") in inspection and a terminal that supplies electric potential which turns the switching device in a state in which the wiring is disconnected (hereinafter called "open") in a product.

In addition, in the liquid crystal display device according to the present invention, when a driver IC is mounted, electric potential which turns the switching device open may also be supplied to the terminal that supplies the electric potential which turns the switching device open from the driver IC.

Further, in the liquid crystal display device according to the present invention, the inspection pad may also be utilized for the grounded electrode.

Furthermore, in the liquid crystal display device according to the present invention, no independent grounded electrode may also be provided.

Furthermore, in the liquid crystal display device according to the present invention, a mark showing a position in which the conductive tape is stuck may be further also provided.

Furthermore, in the liquid crystal display device according to the present invention, wire may also be directly bound from an FPC terminal to some of the signal lines or the scanning lines without passing the switching device.

Furthermore, in the liquid crystal display device according to the present invention, some of the plural inspection pads are covered with the conductive tape and some others may also be exposed.

Furthermore, in the liquid crystal display device according to the present invention, when a driver is mounted, the switching device is not required to be provided to the inspection pad under the driver.

Another liquid crystal display device according to the present invention is based upon a liquid crystal display device where a TFT board provided with a pixel electrode arranged in a matrix, a thin film transistor connected to each pixel electrode, plural scanning lines and plural signal lines, and a CF board provided with a color filter are oppositely arranged, and liquid crystal is sealed between the both boards, and has a characteristic that the liquid crystal display device according to the present invention is provided with a transparent electrode formed on a superficial side of the CF board, an inspection pad formed in a terminal area of the TFT board, a switching device between the inspection pad and the signal line or the scanning line, laser numbering metal for identifying a panel and a conductive tape that electrically connects the transparent electrode of the CF board and the inspection pad of the TFT board, metal of the inspection pad and the laser numbering metal are closely arranged and ITO connected to the metal of the inspection pad is formed with it covering the numbering metal.

In the liquid crystal display device according to the present invention, the inspection pad may also be utilized for a grounded electrode.

In addition, in the liquid crystal display device according to the present invention, the metal of the inspection pad and the laser numbering metal may also be formed in the same process.

Further, the liquid crystal display device according to the present invention may also be a liquid crystal display device according to In-Plane Switching.

A method of manufacturing the liquid crystal display device according to the present invention is based upon a method of manufacturing a liquid crystal display device using a liquid crystal display panel configured by a TFT board which is provided with a pixel electrode arranged in a matrix, a thin film transistor connected to each pixel electrode, plural scanning lines and plural signal lines, and in a terminal area of the TFT board, a grounded electrode, an inspection pad and a switching device between the inspection pad and the signal line or the scanning line are formed, and configured by a CF board which is arranged opposite to the TFT board and provided with a color filter and a transparent electrode on a superficial side, and has a characteristic that the method of manufacturing the liquid crystal display device according to the present invention includes a step of inspecting the liquid crystal display panel using the inspection pad with the switching device closed in inspection and a step of sticking a conductive tape that electrically connects the transparent electrode of the CF board, the grounded electrode and the inspection pad respectively of the TFT board.

The method of manufacturing the liquid crystal display device according to the present invention may further also include a step of driving the liquid crystal display panel with the switching device open.

According to the present invention, since the exposed inspection pad is protected with the conductive tape when the application of resin is ceased, a substance that advances corrosion is prevented from adhering to its surface and the reliability of the inspection pad can be enhanced. In addition, since the grounded electrode and the inspection pad are short-circuited after the conductive tape is stuck, the resistance is reduced more than that in only the grounded electrode and the relief of electrification charge can be advanced.

BRIEF DESCRIPTION OF THE DRAWINGS

FIG. 14 shows one example of an equivalent circuit of a liquid crystal display device.

DETAILED DESCRIPTION OF THE INVENTION

Figure 1:
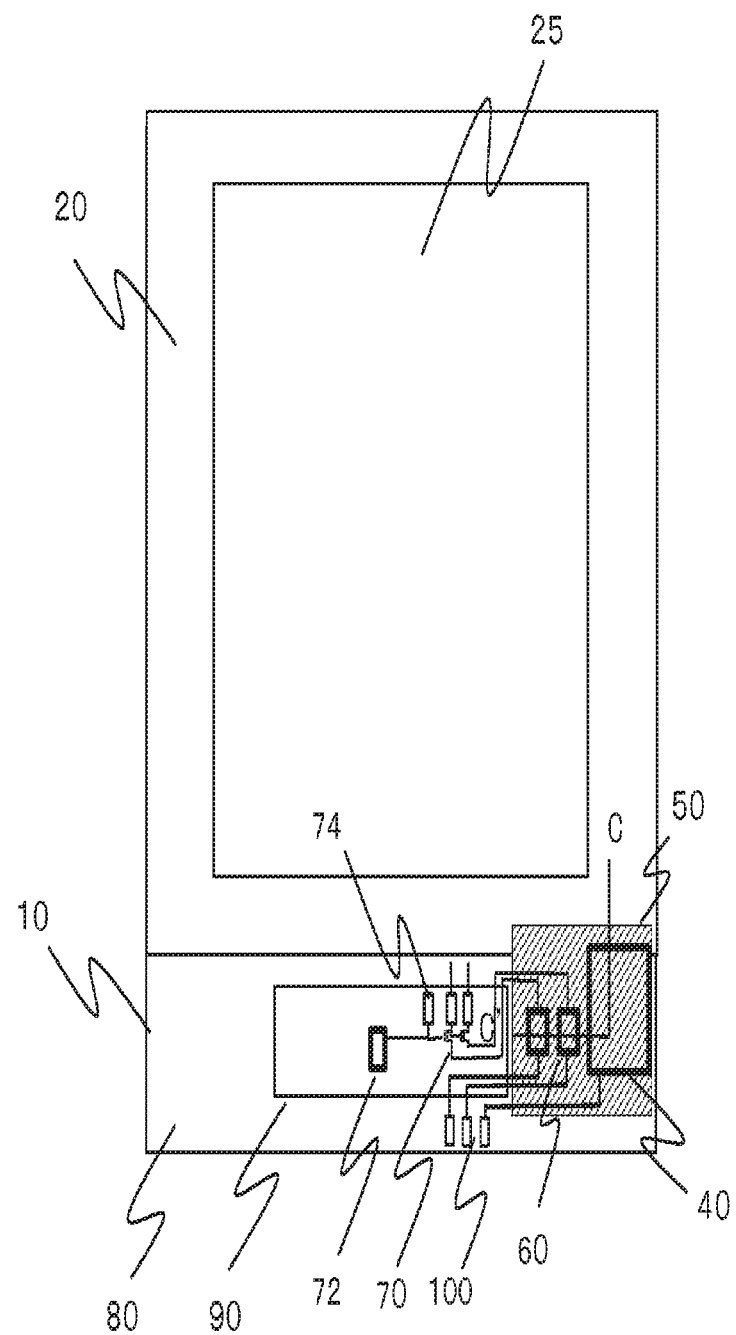
FIG. 1 is a plan view showing the structure of a liquid crystal display device equivalent to a first embodiment of the present invention.

Before the description of embodiments of the present invention, a conventional type liquid crystal display device will be described.

First, one example of an equivalent circuit of the liquid crystal display device will be described referring to FIG. 14. Plural scanning lines 204 and plural signal lines 203 are wired on a board 201 in a matrix and a picture element 206 is connected to the intersection of the scanning lines 204 and the signal lines 203 via TFT 210. A scan driving circuit 208 is connected to the scanning lines 204, a signal driving circuit 207 is connected to the signal lines 203, and voltage is applied to the scanning line 204 and the signal line 203. Common lines 205 are wired in parallel with the scanning lines 204 on the board 201 so as to enable applying common voltage to all picture elements from a common voltage generating circuit 209. A liquid crystal composition is sealed between the board 201 and a board 202 and the whole configures the liquid crystal display device.

Figure 11:
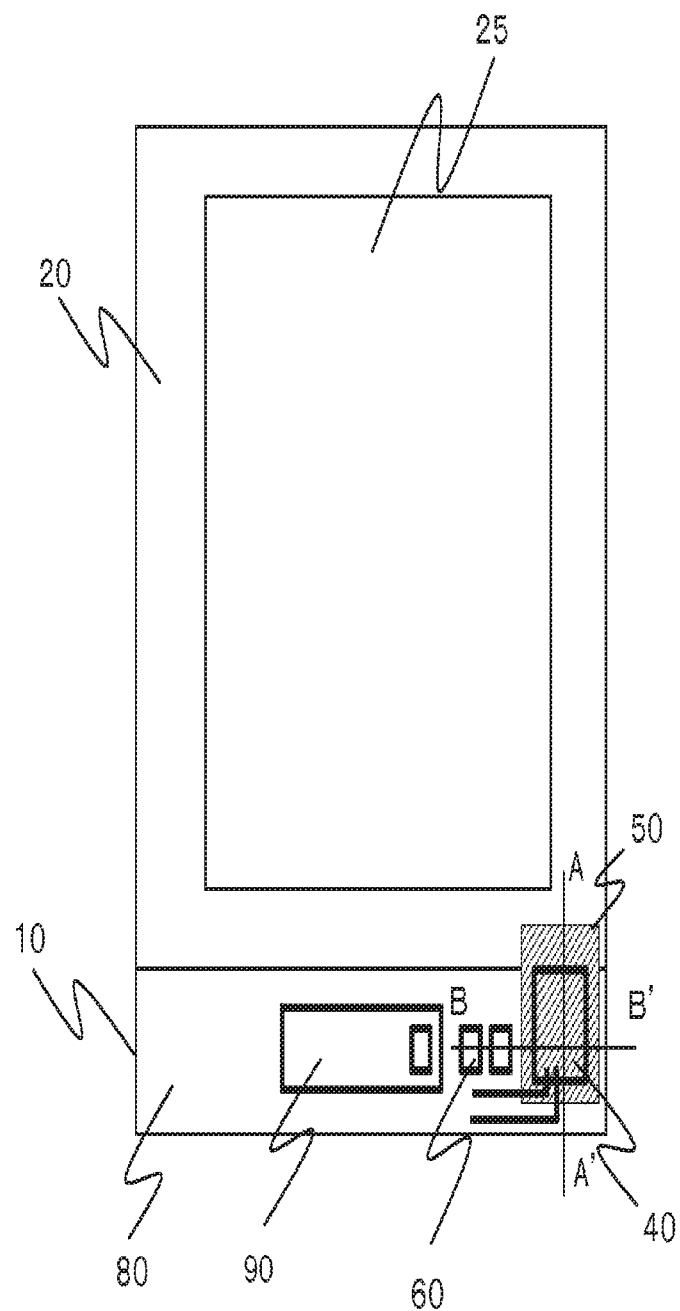
FIG. 11 is a plan view showing the structure of a conventional type liquid crystal display device.
Figure 12:
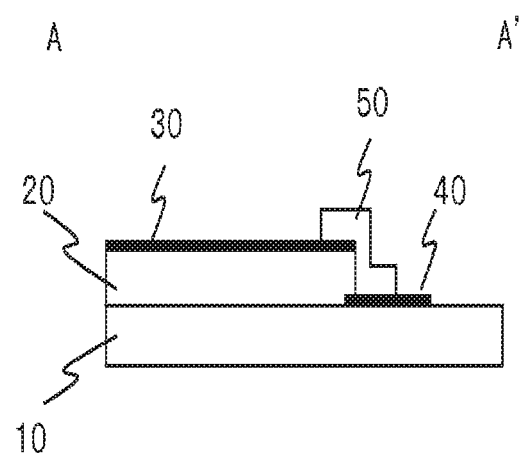
FIG. 12 is a sectional view showing the structure of the conventional type liquid crystal display device and viewed along a line A-A'.
Figure 13:
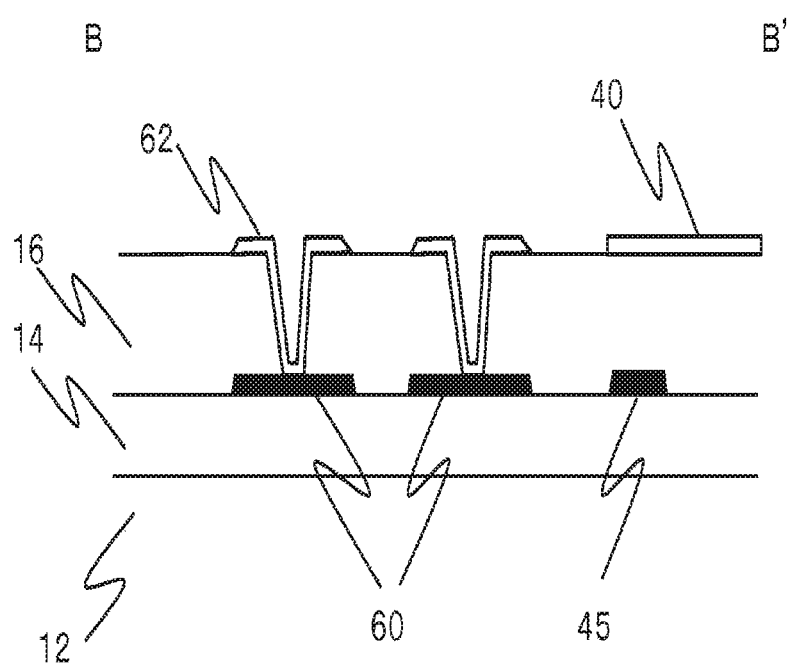
FIG. 13 is a sectional view showing the structure of the conventional type liquid crystal display device and viewed along a line B-B'.

FIGS. 11 to 13 show one example of a liquid crystal display panel researched prior to the present invention. FIG. 11 is its plan view, FIG. 12 is a sectional view viewed along a line A-A', and FIG. 13 is a sectional view viewed along a line B-B'.

As shown in FIGS. 11 to 13, the liquid crystal display panel is configured by sticking a thin film transistor (TFT) board 10 and a color filter (CF) board 20 and sealing liquid crystal between them. In a case of a liquid crystal display panel according to In-Plane Switching (IPS) for example, a transparent electrode 30 made of ITO and the like is formed on the back of the CF board 20 (on the superficial side of the liquid crystal display panel). In addition, in a terminal area 80 of the TFT board 10, an exposed grounded electrode 40 called IPS-GND is formed and is connected to grounding potential for example by connecting it to an FPC terminal and the like. The transparent electrode 30 and the grounded electrode 40 are electrically connected by conductive resin or a conductive tape 50. Hereby, electric charge charged in the CF board 20 can be relieved via the grounded electrode 40. A reference numeral 25 denotes a display area of the liquid crystal display panel.

An inspection pad 60 for inspecting the liquid crystal display panel is provided to the terminal area 80 of the TFT board 10. A reference numeral 90 denotes a driver mounted position. In a low resolution product, inspection pads are arranged under a driver so as to secure reliability. However, when the resolution is enhanced, it is difficult to arrange all inspection pads under the driver and some of the inspection pads are arranged outside the driver. Heretofore, resin and the like are applied to a terminal to protect it, but there is a case that no resin is applied because of module structure and the reduction of a cost, and in that case, the inspection pads arranged outside the driver remain exposed, the corrosion of a contact is feared, an electric field may also leak, and it is undesirable.

FIG. 13 shows one example of a layout of the inspection pad 60 and the grounded electrode 40. An insulating film 14 is provided onto a glass board 12 that configures the TFT board 10, and a wiring layer made of a metal film of the inspection pad 60 and a mark for a conductive tape stuck position 45 are formed on the insulating film. An insulating film 16 is provided onto the wiring layer of the inspection pad and the grounded electrode 40 made of ITO is formed on the insulating film. The grounded electrode 40 and the mark for the conductive tape stuck position 45 are aligned and the mark for the conductive tape stuck position 45 functions as a mark when the conductive tape 60 is stuck. The insulating film 16 on the inspection pad 60 is bored and an ITO layer 62 of the inspection pad for touching an inspection probe is formed from the inside of the hole to a surface of the insulating film 16. The insulating films 14 and 16 may also be inorganic films or organic films or may also be a laminated film of both, and the insulating film 14 can be also omitted.

In this liquid crystal display panel, the inspection pads are not arranged under the driver and when no resin is applied onto the inspection pad, the inspection pad is exposed, and fear of reliability such as the corrosion of a contact arises.

The embodiments of the present invention will be described referring to the drawings below. The same name and the same reference numeral are allocated to an element having the same function in all the drawings for explaining the embodiments and the repeated description is omitted.

First Embodiment

Figure 2:
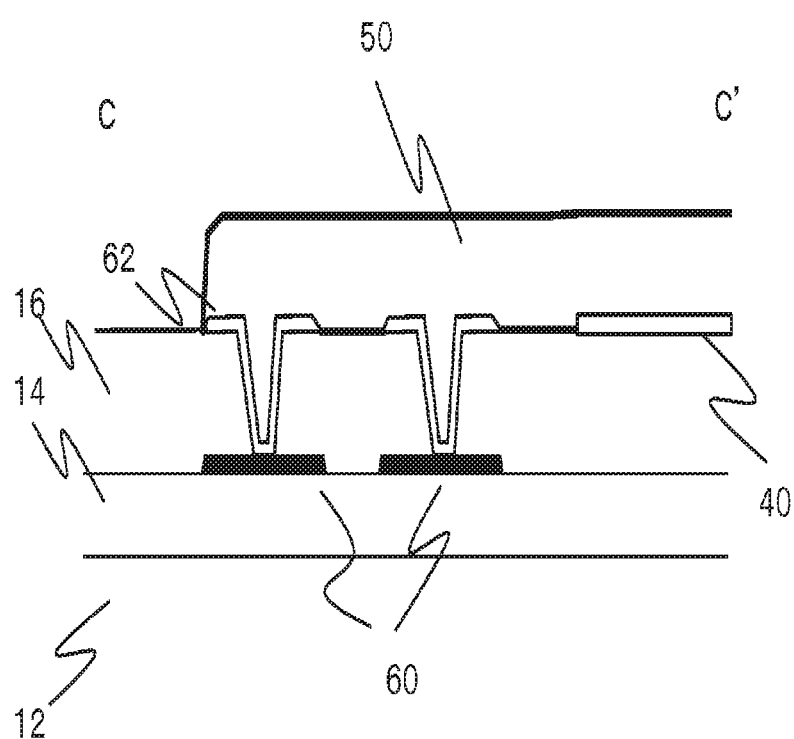
FIG. 2 is a sectional view showing the liquid crystal display device equivalent to the first embodiment of the present invention and viewed along a line C-C'.

FIGS. 1 and 2 show the structure of a liquid crystal display device equivalent to a first embodiment of the present invention. FIG. 1 is its plan view and FIG. 2 is a sectional view viewed along a line C-C'.

As shown in FIG. 1, a liquid crystal display panel is configured by sticking a TFT board 10 and a CF board 20 and sealing liquid crystal between them. A transparent electrode 30 (not shown) made of ITO and the like is formed on the back of the CF board 20 (on the superficial side of the liquid crystal display panel). A reference numeral 25 denotes a display area.

An inspection pad 60 and an exposed grounded electrode 40 called IPS-GND for example are formed in a terminal area 80 of the TFT board 10. The inspection pad 60 and the grounded electrode 40 are wired to an FPC terminal 100. A switching device made of a transistor for example for nullifying an inspection line 70 is provided to a driver mounted position 90 of the terminal area 80, is wired to the inspection pad 60, and is connected to a signal line or a scanning line of the liquid crystal display panel. In addition, a pad for supplying high electric potential in inspection 72 and a bump 74 for supplying low electric potential when a driver is mounted are connected to a gate of a MOS transistor that configures the switching device for example of the switching device 70 for nullifying an inspection line. A driver IC is mounted in the driver mounted position 90 and is electrically connected to wiring on the TFT board via the bump.

In a sectional view shown in FIG. 2, an insulating film 14 is provided onto a glass board 12 that configures the TFT board 10 and a wiring layer made of a metal film of the inspection pad 60 is formed on the insulating film. An insulating film 16 is provided onto the wiring layer of the inspection pad and the grounded electrode 40 made of ITO is formed on the insulating film. The insulating film 16 on the inspection pad 60 is bored and an ITO layer 62 of the inspection pad for touching an inspection probe is formed from an inner face of the hole to a surface of the insulating film 16. In this embodiment, as shown in FIGS. 1 and 2, the conductive tape 50 is stuck so as to cover the grounded electrode 40 and the exposed ITO layer of the inspection pad 60 and so as to electrically connect it to the transparent electrode 30 of the CF board.

Operation in inspection in the first embodiment and in a product after it (when the driver is mounted) will be described below. In inspection, no conductive tape 50 and no driver are mounted. High electric potential is supplied to the pad 72 for supplying high electric potential in inspection, the inspection pad, the signal line, the scanning line and the like are electrically connected by the switching device 70 for nullifying an inspection line, and the signal line, the scanning line and the like of the liquid crystal display panel can be inspected by touching the probe and the like to the inspection pad 60. When the liquid crystal display panel is judged as a non-defective one after the inspection is finished, the conductive tape 50 is stuck on the surfaces of the grounded electrode 40 and the inspection pad 60, is connected to the transparent electrode on a surface of the CF board, and the driver IC is mounted in the driver mounted position 90. When the driver is operated, low electric potential is supplied to the bump for supplying low electric potential when the driver is mounted 74, the inspection pad 60 is disconnected from the signal line, the scanning line and the like by the switching device 70 for nullifying an inspection line, and a signal can be supplied to the signal line and the scanning line from the driver. It is described above that low electric potential is supplied to the bump for supplying low electric potential 74 from the driver, although low electric potential may also be supplied from FPC. In addition, it is described above that the pad for supplying high electric potential in inspection 72 and the bump for supplying low electric potential when the driver is mounted 74 are separate terminals, although high electric potential is supplied in inspection and low electric potential may also be supplied in a product respectively from one terminal.

According to this embodiment, as the switching device 70 for nullifying an inspection line is turned open when the driver is mounted after inspection is finished, the following connection has no effect upon driving even if the grounded electrode 40 and the exposed inspection pad 60 are connected at the same electric potential by the conductive tape 50. Accordingly, the inspection pad 60 exposed in the terminal area can be protected with the conductive tape 50 by sticking the conductive tape 50 on the grounded electrode 40 and the inspection pad 60. Further, the reduction of the resistance of the grounded electrode can be realized by also making the inspection pad 60 function as a conductor and the relief of electrification charge can be advanced.

Figure 3:
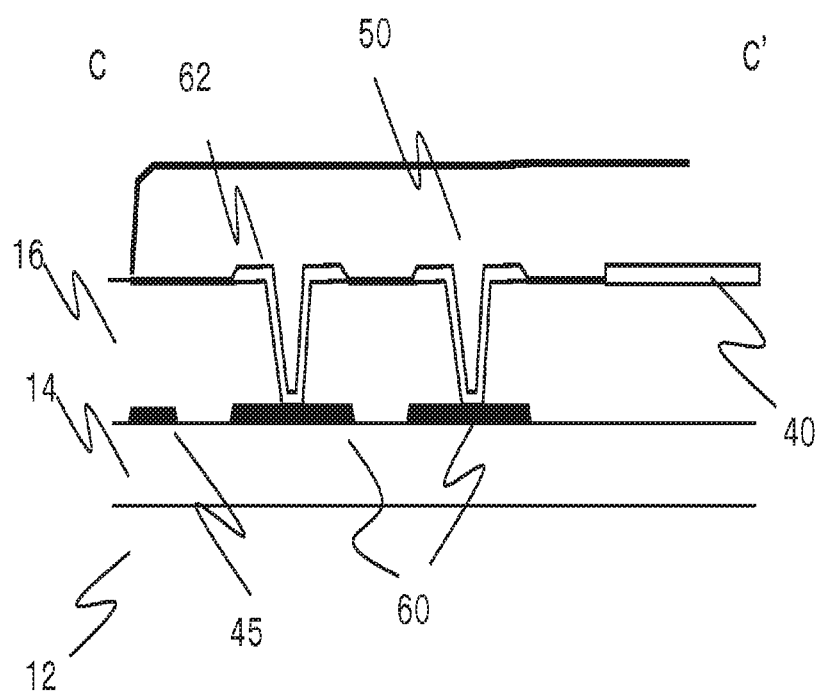
FIG. 3 is a sectional view viewed along a line C-C' in a modified example of the liquid crystal display device equivalent to the first embodiment of the present invention.

FIG. 3 shows a modified example of the first embodiment. In this modified example, a mark 45 for a stuck position of a conductive tape is formed. The mark 45 for the stuck position has only to be formed at the same time with the formation of a metal film of an inspection pad 60. The conductive tape 50 can be stuck on the inspection pad 60 and a grounded electrode 40 based upon the mark 45 for the stuck position. A mark corresponding to the grounded electrode 40 shown in FIG. 13 may also be provided.

Figure 4:
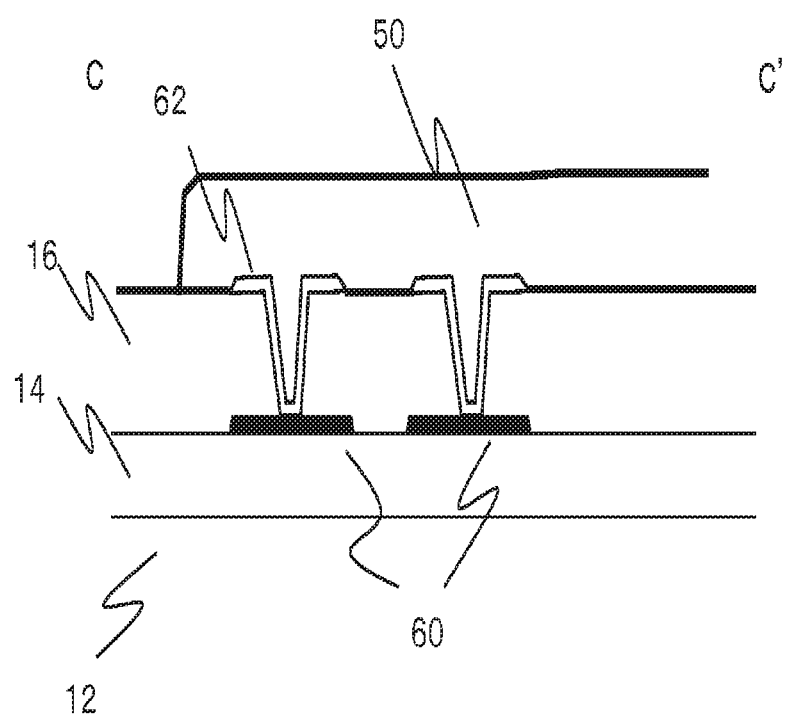
FIG. 4 is a sectional view viewed along a line C-C' in a modified example of the liquid crystal display device equivalent to the first embodiment of the present invention.

FIG. 4 shows another modified example of the first embodiment. In this modified example, a grounded electrode 40 is removed and only an inspection pad is utilized for a grounded electrode. As the inspection pad 60 is disconnected by a switching device 70 for nullifying an inspection line after inspection is finished, the inspection pad can be utilized for the grounded electrode. Space for the grounded electrode 40 is not required, a liquid crystal display panel can be miniaturized, and a frame can be narrowed.

Second Embodiment

Figure 5:
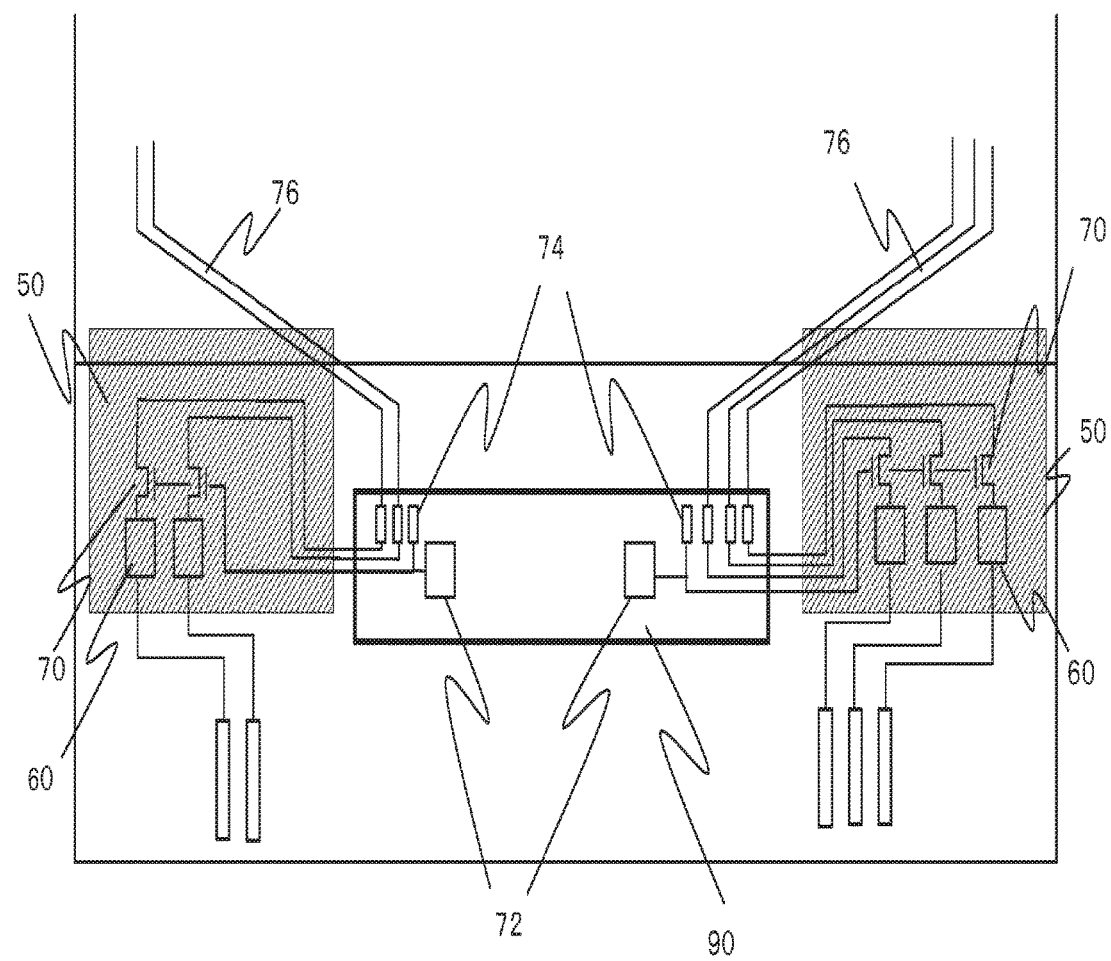
FIG. 5 is a plan view showing the structure of a liquid crystal display device equivalent to a second embodiment of the present invention.

FIG. 5 is a plan view showing a liquid crystal display device equivalent to a second embodiment of the present invention.

In this embodiment, as shown in FIG. 5, an inspection pad 60 and a switching device 70 for nullifying an inspection line are arranged on the right side and on the left side of a driver mounted position 90 and the switching device 70 for nullifying an inspection line is connected to the inspection pad 60 and a signal line 76. A conductive tape 50 is respectively stuck on the right side and on the left side so as to connect the inspection pad 60 and a transparent electrode 30 on a surface of a CF board.

When the inspection pad is also utilized for the grounded electrode, the resistance can be reduced by using plural conductive tapes.

Third Embodiment

Figure 6:
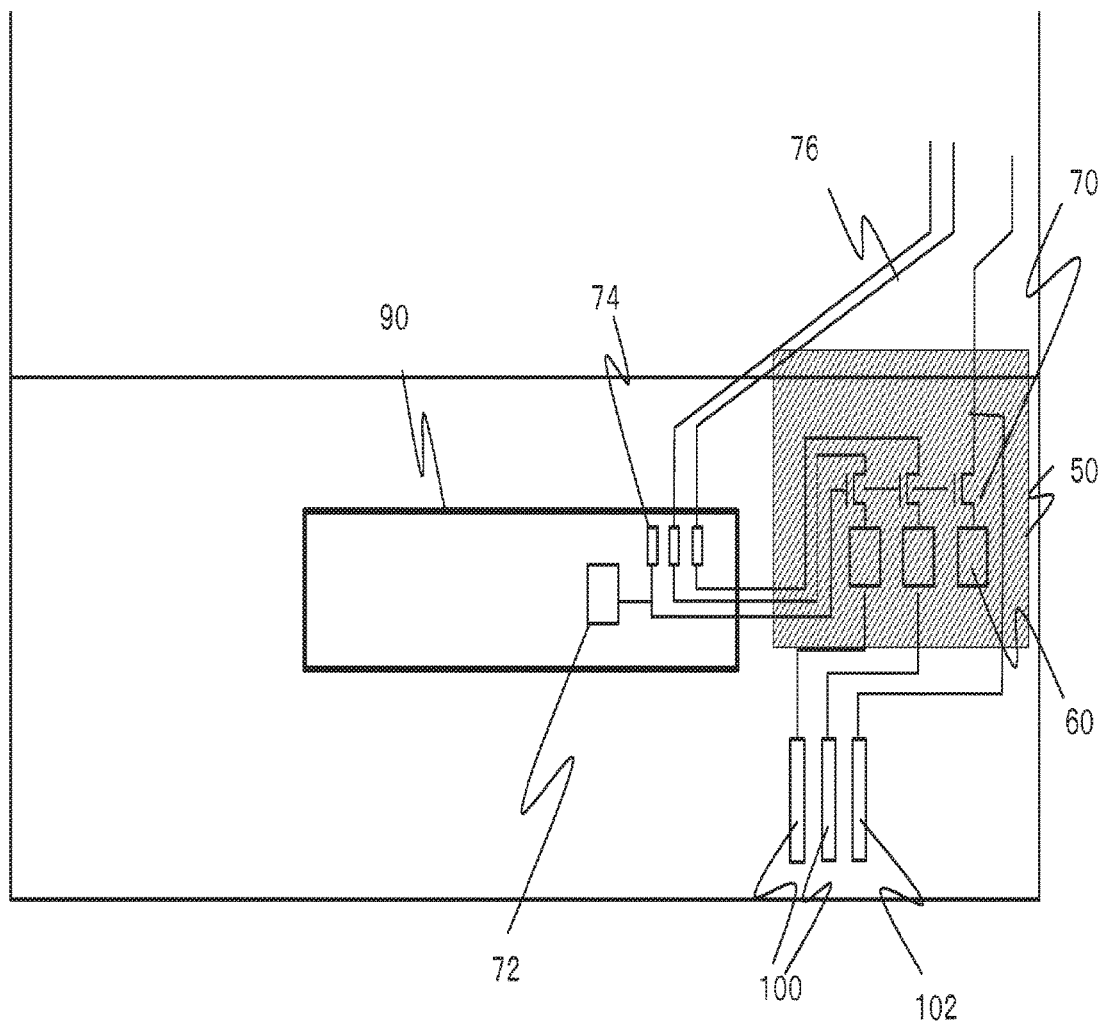
FIG. 6 is a plan view showing the structure of a liquid crystal display device equivalent to a third embodiment of the present invention.

FIG. 6 is a plan view showing a liquid crystal display device equivalent to a third embodiment of the present invention.

This embodiment is partially different in wire connected to an inspection pad 60 and a switching device 70 for nullifying an inspection line. The switching device 70 for nullifying an inspection line is connected to the inspection pad 60 connected to an FPC terminal 100 on the left side and is connected to a signal line 76. When a driver is mounted, the switching device 70 for nullifying an inspection line is turned open, and driver IC and the signal line 76 are connected.

In the meantime, an FPC terminal 102 on the right side is connected to the signal line without passing the switching device 70 for nullifying an inspection line. No output of the driver is supplied to the signal line and a signal can be supplied from the FPC terminal 102. Accordingly, the liquid crystal display device equivalent to this embodiment can be also used for a type that a signal is supplied from an output terminal of the FPC.

Fourth Embodiment

Figure 7:
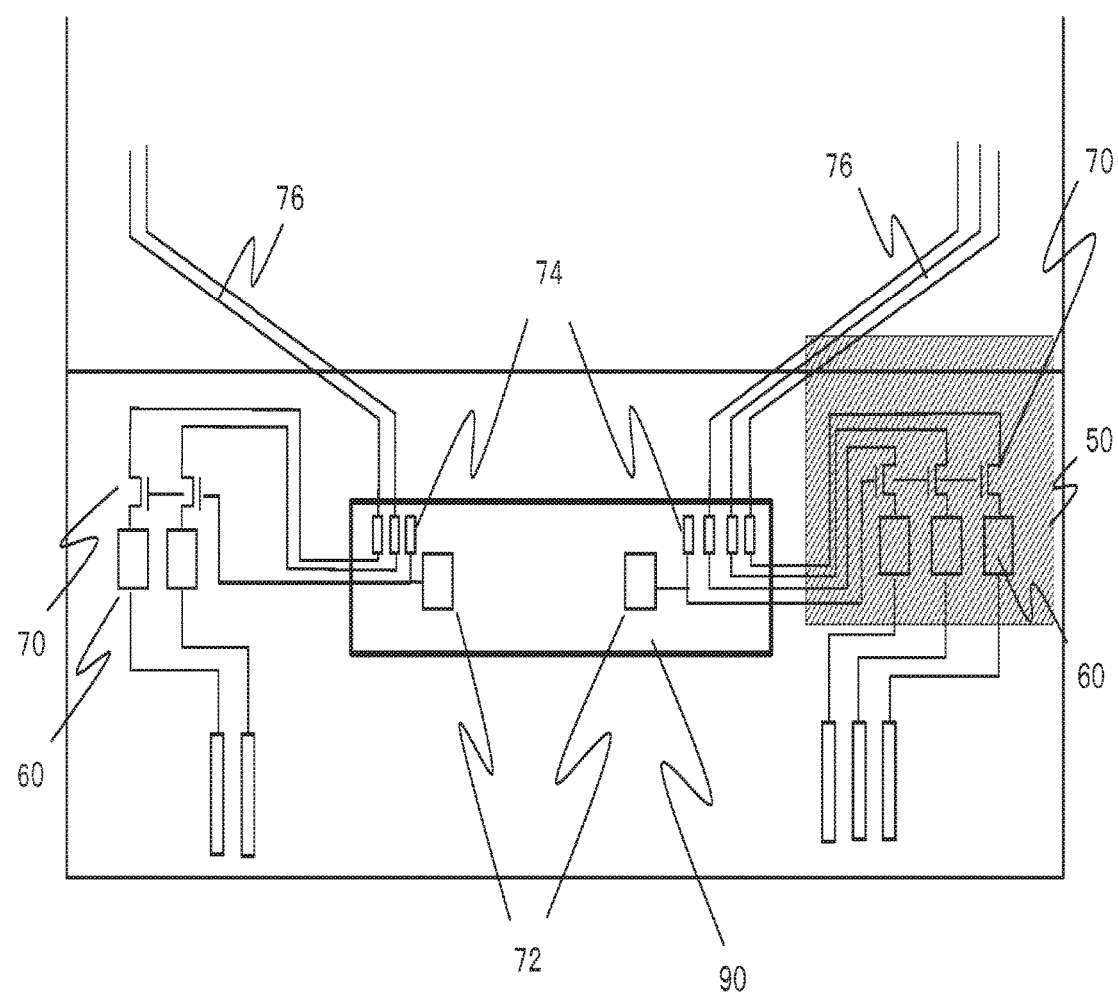
FIG. 7 is a plan view showing the structure of a liquid crystal display device equivalent to a fourth embodiment of the present invention.

FIG. 7 is a plan view showing a liquid crystal display device equivalent to a fourth embodiment of the present invention.

In this embodiment, in the arrangement of the inspection pads 60, the switching devices 70 for nullifying the inspection line and the signal lines 76 in the second embodiment shown in FIG. 5, a conductive tape 50 is stuck on an inspection pad 60 on the right side. However, the conductive tape is selectively provided to a part of inspection pad without sticking a conductive tape on an inspection pad 60 on the left side, the number of conductive tapes is inhibited, and the relief which is one of effects of the present invention of electrification charge can be advanced.

Fifth Embodiment

Figure 8:
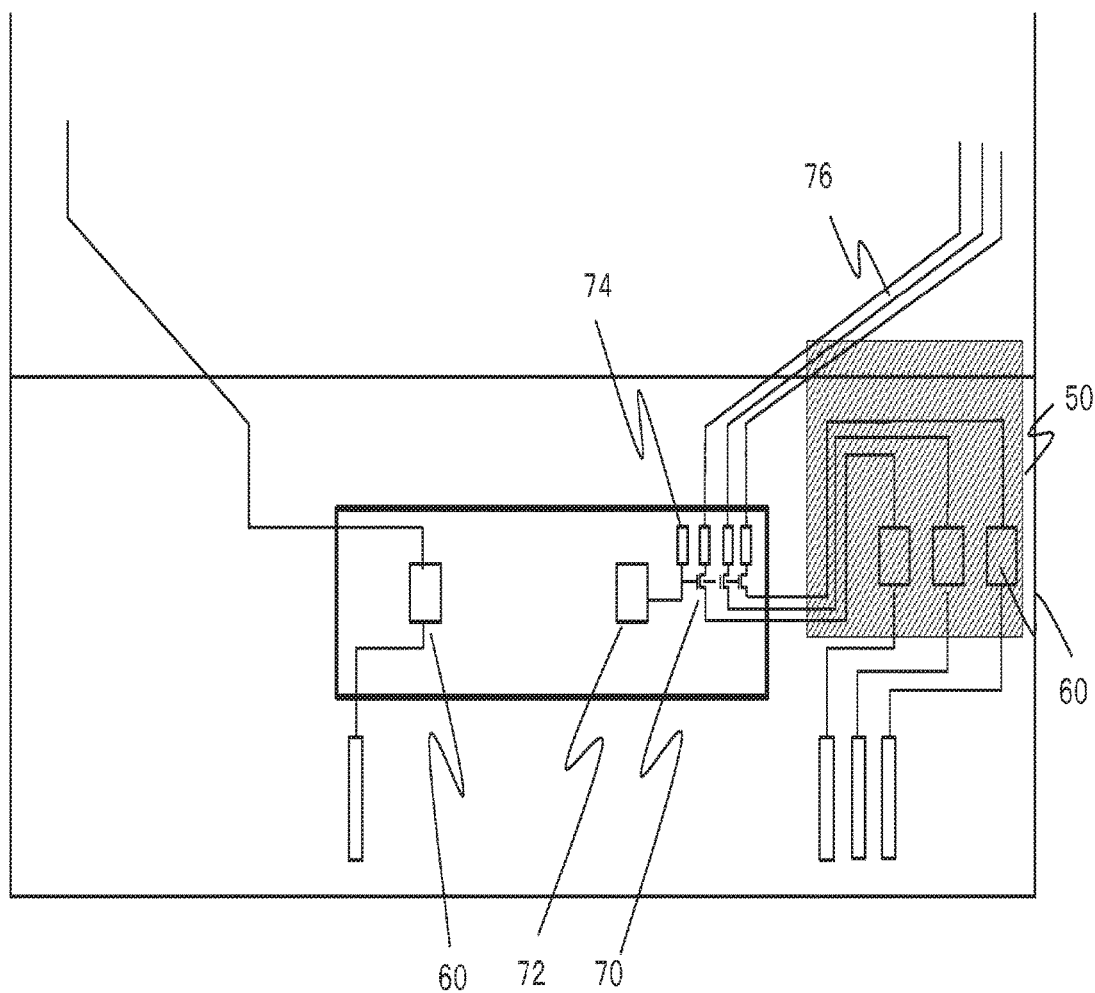
FIG. 8 is a plan view showing the structure of a liquid crystal display device equivalent to a fifth embodiment of the present invention.

FIG. 8 is a plan view showing a liquid crystal display device equivalent to a fifth embodiment of the present invention.

This embodiment is an example in which an inspection pad to which a switching device for nullifying an inspection line is connected and an inspection pad to which no switching device for nullifying an inspection line is connected coexist. The right inspection pad 60 is provided outside a driver mounted position 90 and the switching device 70 for nullifying an inspection line is connected to it. A conductive tape 50 is stuck on the inspection pad.

In the meantime, the left inspection pad 60 is provided to the driver mounted position 90, no switching device for nullifying an inspection line is connected to the inspection pad, and the inspection pad is directly connected to a signal line. No conductive tape is stuck on the inspection pad.

Sixth Embodiment

Figure 9:
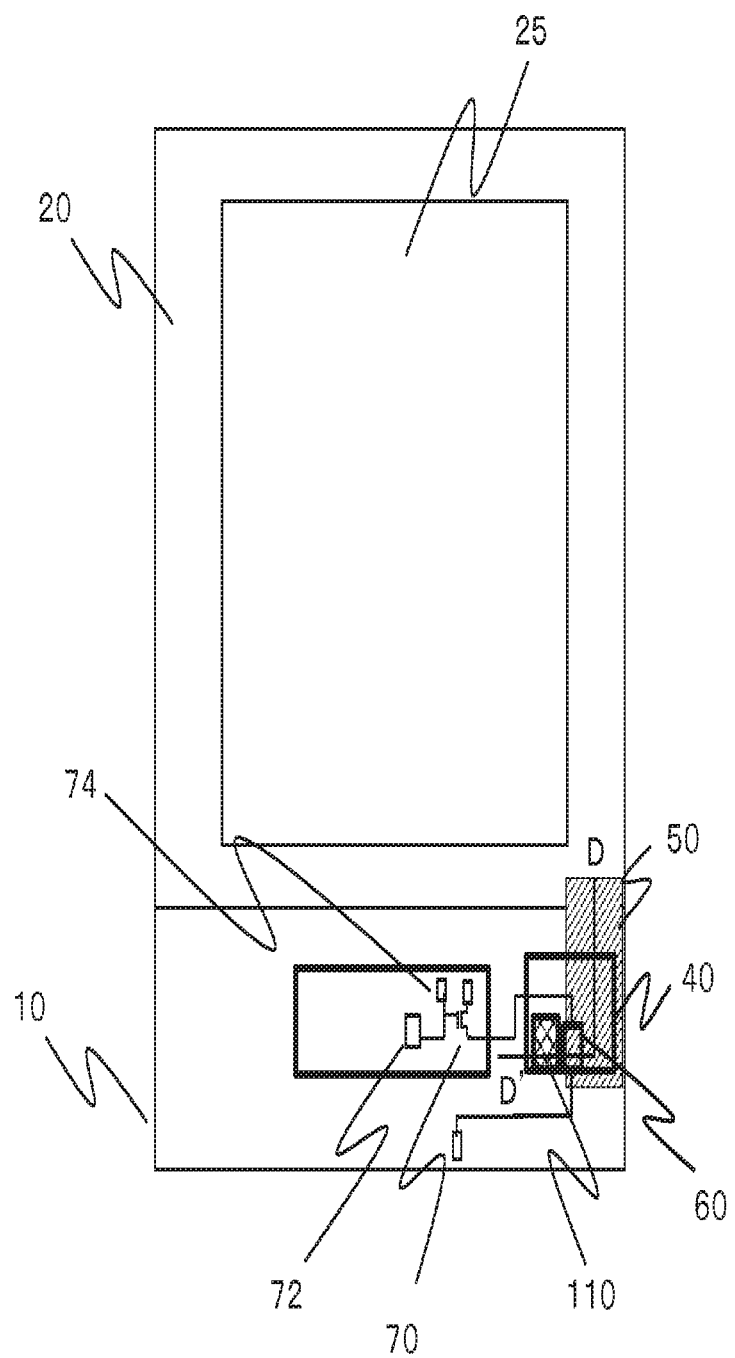
FIG. 9 is a plan view showing the structure of a liquid crystal display device equivalent to a sixth embodiment of the present invention.
Figure 10:
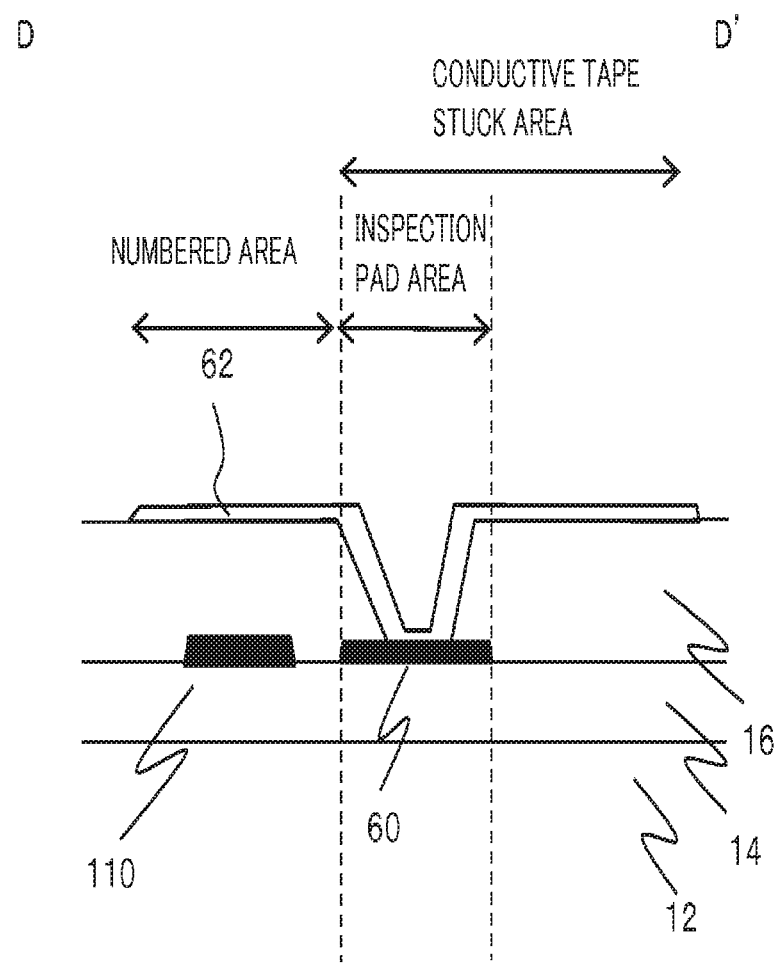
FIG. 10 is a sectional view showing the structure of the liquid crystal display device equivalent to the sixth embodiment of the present invention.

FIGS. 9 and 10 show the structure of a liquid crystal display device equivalent to a sixth embodiment of the present invention. FIG. 9 is its plan view and FIG. 10 is a sectional view viewed along a line D-D'.

In this embodiment, the structure in which an inspection pad 60, a grounded electrode 40 and a laser numbering metal 110 are arranged is improved. In this case, the laser numbering metal denotes a metal layer for recording an identification code for identifying a liquid crystal display panel and the like. As shown in FIG. 10, an insulating film 14 is provided onto a glass board 12 that configures a TFT board 10, and a metal film of the inspection pad 60 and the laser numbering metal are closely formed on a surface of the insulating film 14 by deposition and the like. An insulating film 16 is formed to cover the metal film of the inspection pad and the laser numbering metal. The insulating film 16 on the upside of the metal film of the inspection pad is bored and a transparent electrode made of ITO 62 is formed from the inside of the hole to a surface of the insulating film 16. The ITO 62 is also formed in a numbering area on the upside of the laser numbering metal 110 in addition to an area which includes an inspection pad area and in which a conductive tape is stuck.

The conductive tape 50 is stuck to the area which includes the inspection pad area and in which the conductive tape is stuck. No conductive tape 50 is stuck to the numbering area on the upside of the laser numbering metal 110 so as to secure the visibility of the laser numbering metal 110. The configuration of a switching device 70 for nullifying an inspection line, a switching device 72 for supplying high electric potential in inspection, a bump 74 for supplying low electric potential when a driver is mounted and the like is similar to that in the first embodiment.

According to this embodiment, space is saved and the manufacture can be facilitated respectively by closely arranging the metal film of the inspection pad and the laser numbering metal and forming them in a process of the same metal film. In addition, space is saved and the manufacture can be facilitated respectively by utilizing the ITO layer of the inspection pad for a grounded electrode 40.

There is a case that a color filter is formed on a TFT board. In this specification, a board opposite to the TFT board is also called a CF board in such a configuration. The conductive tape includes a conductive tape onto which an anisotropic conductive sheet is provided and only a thermocompression-bonded part of which has conductivity. In addition, there is a case that a conductive film provided on the superficial side of the CF board is also used for an electrode of a touch panel. In that case, an inspection terminal is covered with a conductive tape connected to the electrode of the touch panel so as to electrically connect to an inspection pad and a signal for driving the electrode for the touch panel can be also supplied to the inspection pad.

What is claimed is:

1. A liquid crystal display device comprising:
   a TFT substrate provided with a pixel electrode arranged in a matrix, a thin film transistor connected to each pixel electrode, a plurality of scanning lines and a plurality of signal lines,
   a CF substrate provided with a color filter,
   a liquid crystal layer sandwiched between the TFT substrate and the CF substrate,
   a transparent electrode layer formed on an outer surface of the CF substrate;
   an identification metal layer for identifying a panel, wherein the identification metal layer is formed in a terminal area of the TFT substrate; and
   a conductive tape overlapping the transparent electrode of the CF substrate and the identification metal layer of the TFT substrate,
   wherein an inspection pad, a switching element for controlling a connection between the inspection pad and the signal line or a connection between the inspection pad and the scanning line are formed in the terminal area,
   wherein the inspection pad and the identification metal layer are formed on the same layer on the TFT substrate, and
   wherein an insulating layer is formed on the inspection pad and the identification metal layer, the insulating layer has an opening at a position of the inspection pad.

2. The liquid crystal display device according to claim 1, wherein a mark for identification of the panel is formed in the identification metal layer.

3. The liquid crystal display device according to claim 1, wherein the inspection pad is disposed adjacent to the identification metal layer.

4. The liquid crystal display device according to claim 1, wherein the liquid crystal display device is an In-Plane Switching type liquid crystal display device.

5. The liquid crystal display device according to claim 1, wherein a transparent conductive film is formed above the inspection pad via an insulating film, and
   the transparent conductive film is connected to the inspection pad in a contact hole in the insulating film.

6. A liquid crystal display device comprising:
   a TFT substrate provided with a pixel electrode arranged in a matrix, a thin film transistor connected to each pixel electrode, a plurality of scanning lines and a plurality of signal lines,
   a CF substrate provided with a color filter,
   a liquid crystal layer sandwiched between the TFT substrate and the CF substrate,
   a transparent electrode layer formed on an outer surface of the CF substrate;
   an identification metal layer for identifying a panel, wherein the identification metal layer is formed in a terminal area of the TFT substrate; and
   a conductive tape overlapping the transparent electrode of the CF substrate and the identification metal layer of the TFT substrate,
   wherein an inspection pad and the identification metal layer are formed on the same layer on the TFT substrate, and
   wherein an insulating layer is formed on the inspection pad and the identification metal layer, the insulating layer has an opening at a position of the inspection pad.

7. The liquid crystal display device according to claim 6, wherein a mark for identification of the panel is formed in the identification metal layer.

8. The liquid crystal display device according to claim 6, wherein the liquid crystal display device is an In-Plane Switching type liquid crystal display device.

9. The liquid crystal display device according to claim 6, wherein a transparent conductive film is formed above the inspection pad via an insulating film, and
    the transparent conductive film is connected to the inspection pad in a contact hole in the insulating film.

* * * * *